W. D. DEWEND.
WHEEL ADJUSTING MECHANISM FOR WHEELED PLOWS.
APPLICATION FILED AUG. 12, 1915.
1,232,240.
Patented July 3, 1917.
3 SHEETS—SHEET 1.
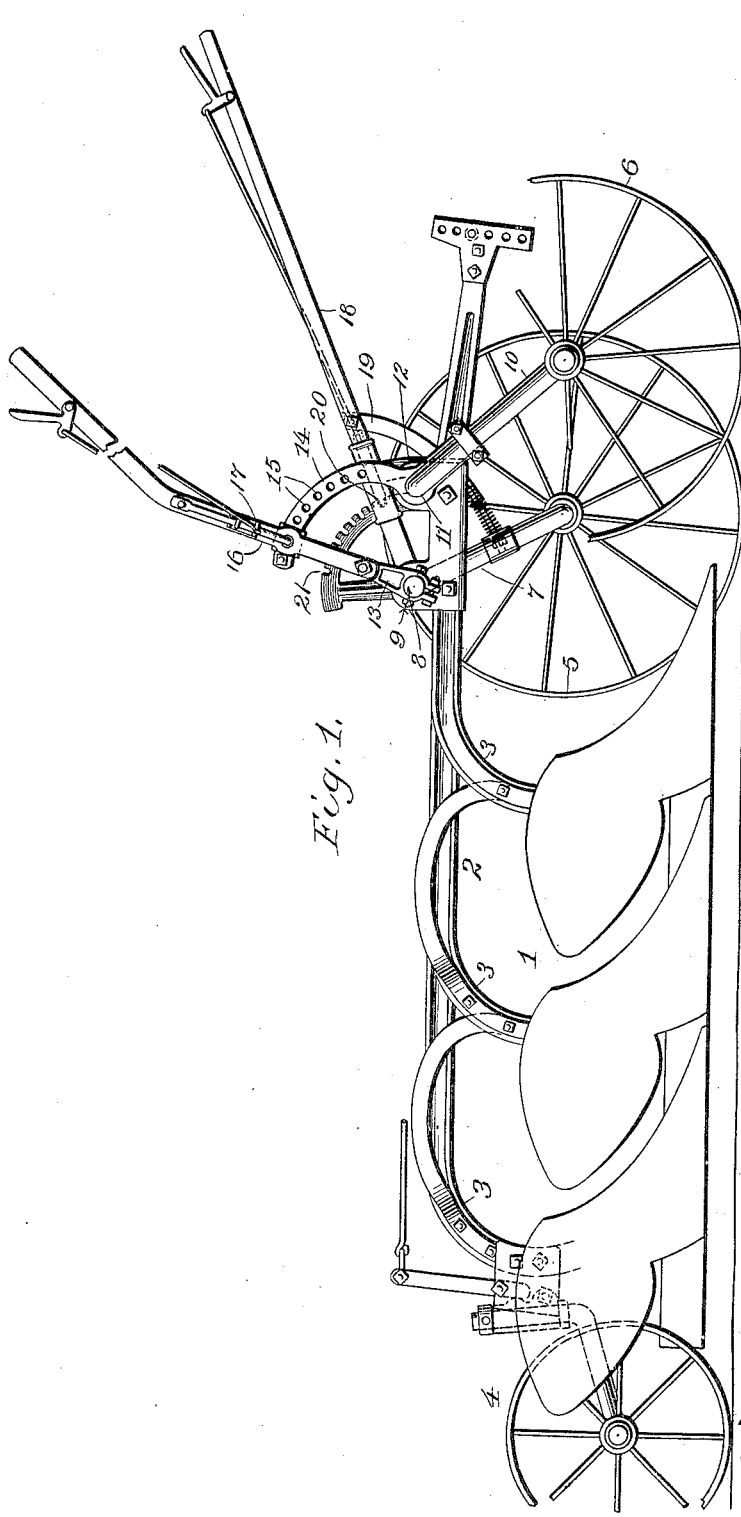

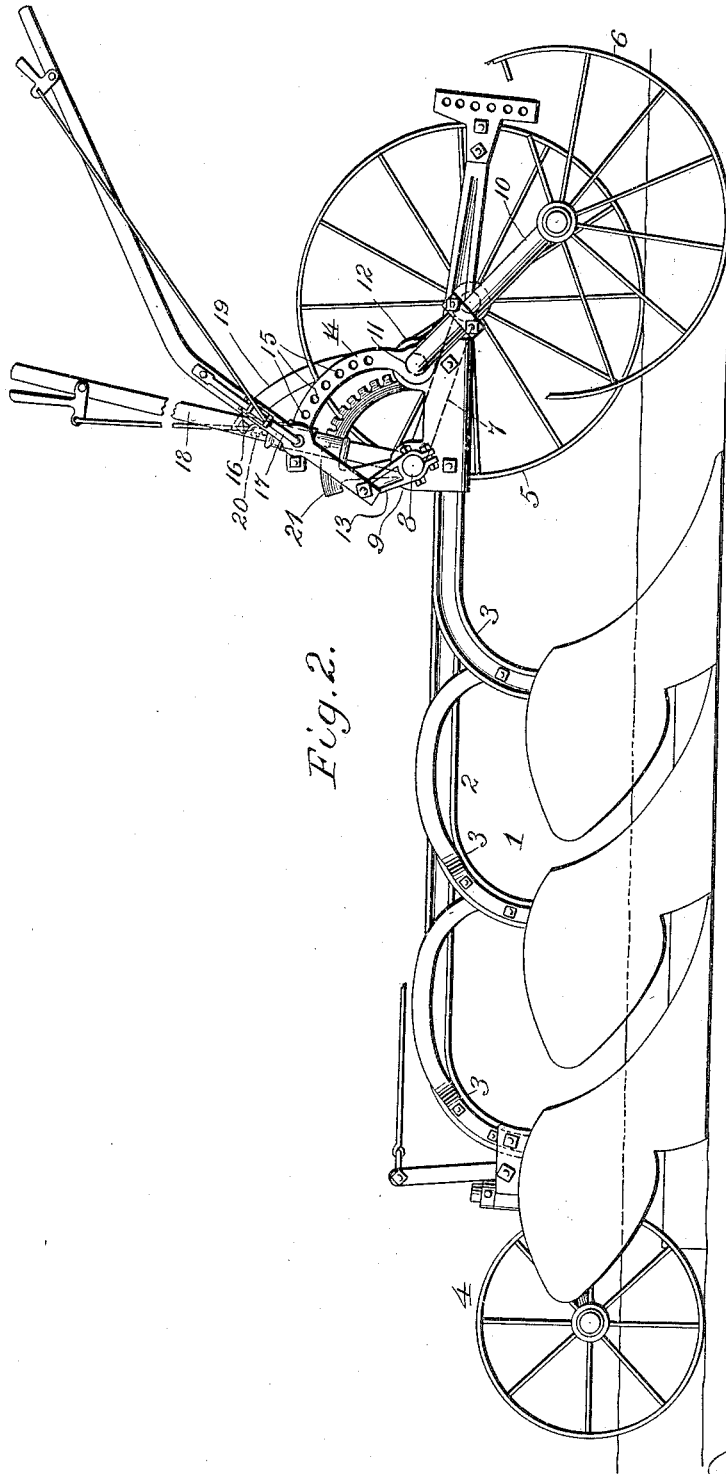

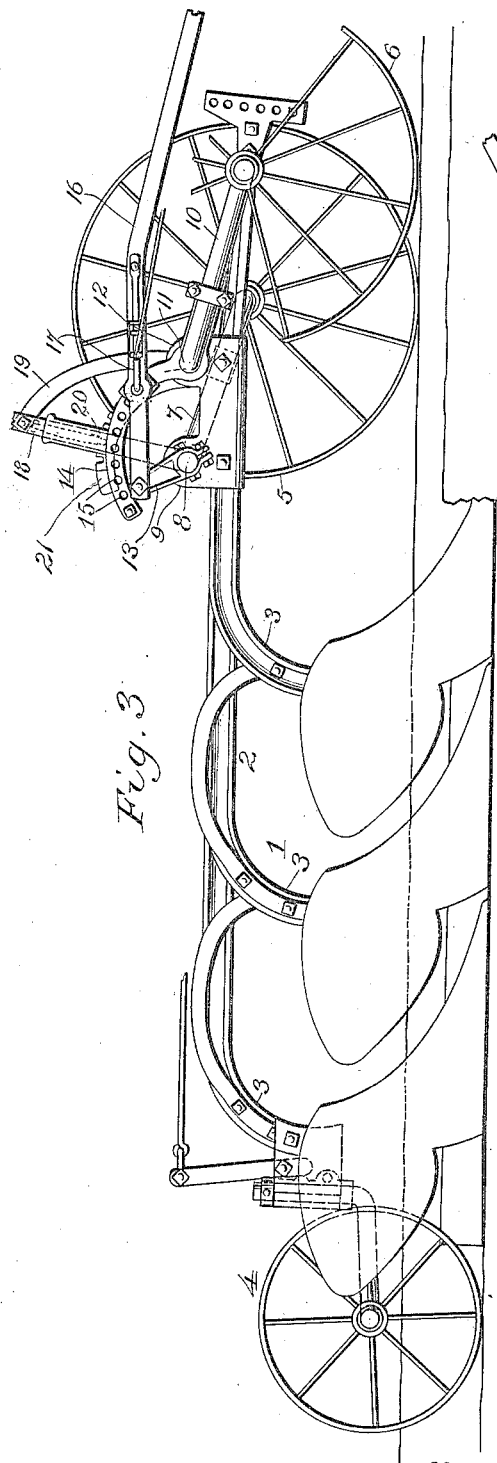
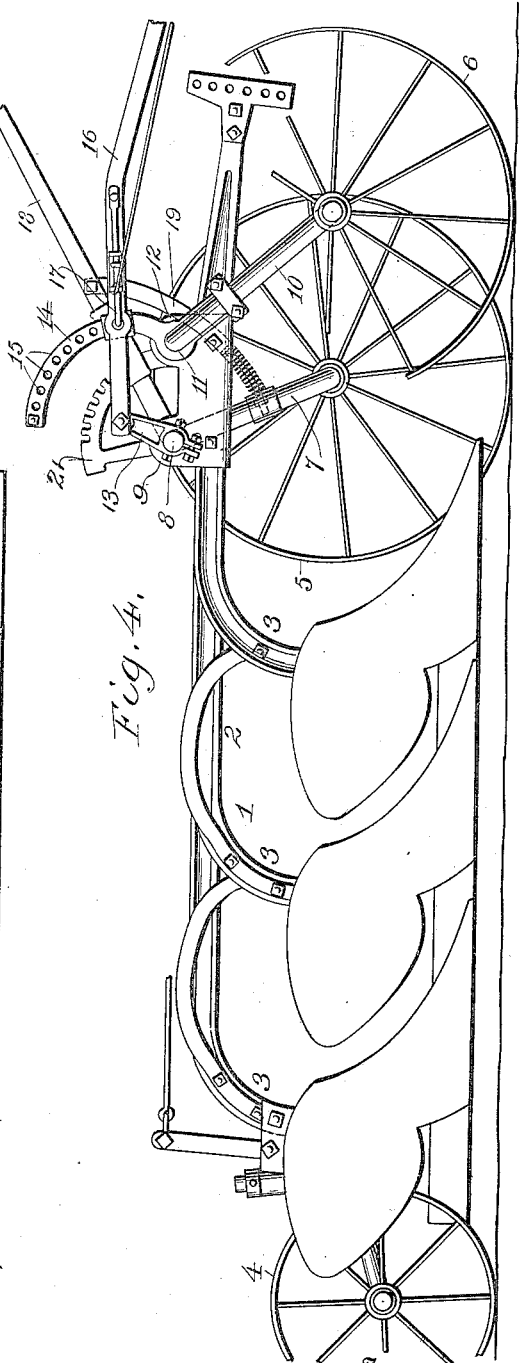

UNITED STATES PATENT OFFICE.

WILLIAM D. DEWEND, OF MOLINE, ILLINOIS, ASSIGNOR TO MOLINE PLOW COMPANY, A CORPORATION OF ILLINOIS.

WHEEL-ADJUSTING MECHANISM FOR WHEELED PLOWS.

1,232,240.   Specification of Letters Patent.   Patented July 3, 1917.

Application filed August 12, 1915. Serial No. 45,094.

*To all whom it may concern:*

Be it known that I, WILLIAM D. DEWEND, a citizen of the United States, residing at Moline, in the county of Rock Island and State of Illinois, have invented certain new and useful Improvements in Wheel-Adjusting Mechanism for Wheeled Plows, of which the following is a specification, reference being had therein to the accompanying drawing.

This invention relates to agricultural implements, and more particularly wheeled plows of the type in which a frame, adapted to carry a plow or plows, is supported by ground wheels movable up and down relatively to the frame, to respectively lower and raise the plows. The invention is designed with special reference to plows in which one of the ground wheels is a land wheel, and the other a furrow wheel, the object of the invention being to so control the up and down movements of the wheels, that they may be caused to move together, relatively to the frame, equal vertical distances to adapt the machine for "opening up" the furrows; or they may be caused to move together different vertical relative distances, to adapt the wheels to occupy different levels in the normal plowing operation. A further object of the invention is to so control the movements of the wheels, that, whatever relative levels they occupy when the plows are down in action, the wheels will be moved to the same level when the plows are raised for transportation, or for turning at the ends of the furrows.

With these ends in view, my invention consists firstly of means for raising the ground wheels to lower the plows into action, the said means being constructed to cause the wheels to move together different relative vertical distances, so that in moving the wheels upwardly from a common level to lower the plows, they will, when the plows have been lowered to the proper depth, occupy different relative levels, whereby the furrow wheel may travel at a lower level in the furrow, and the land wheel at a higher level on the land.

The invention consists secondly in means for adjusting or setting the wheels relatively to each other to vary the depth of the cut, said adjusting means being so constructed and arranged that, whatever relative levels the two wheels may occupy when they are raised and with the plows in action, they will, when lowered to raise the plows, move to the same relative levels. Further, the invention consists in so constructing and arranging the adjusting means, that the wheels may be caused, when raised, to occupy the same relative levels, to the end that with the plows down in action, both wheels may travel on the land, and will maintain the plows in level condition, thereby adapting the machine for "opening up" the furrows.

In the more specific embodiment of the invention, the ground and furrow wheels are mounted on wheel supports provided with journals mounted in the frame to rock on transverse horizontal axes, the land wheel support being provided with a lateral arm, and the furrow wheel support being provided likewise with a lateral arm, but of greater length than the other arm, an adjusting lever being jointed to the arm on the land wheel support, and being adapted to be connected with the other arm, the said arms being so related to the respective journals, and the relation of the connecting lever to said parts being such, that with the ground wheels down at the same level and with the frame and plows elevated, the lever may be locked in different positions of adjustment lengthwise of the arm on the furrow wheel support. As a result of this construction, with the lever connected to said arms at the same distance from the axes of the journals, the wheels will be caused to move together equal distances and at the same relative levels, so that when raised to lower the plows into action, they will both travel at the same level on the land, and will maintain the plow bottoms level in "opening up" the furrows. Also and by reason of the construction described, the adjusting lever may be set to increase the distance of its connection with the arm on the furrow wheel support, from the axis of said arm, whereby in the upward movements of the wheels, and due to the difference in the effective lengths of the arms, the two wheels will be moved different relative distances, and the effective lengths of the furrow wheel arm being greater than the other, the land wheel will move a greater distance than the furrow wheel in lowering the plows to the proper depth, and the wheels will occupy different levels, the land wheel at a higher level to travel on the land, and the furrow wheel at a lower level to travel in the furrow.

In the accompanying drawings I have shown my invention embodied in one form by way of example, and which in practice has been found to answer to a satisfactory degree the ends to be attained, but it is manifest that the invention may be embodied in other forms without departing from the spirit of the invention; and further it will be understood that the invention is not limited to any particular form or construction of the parts except in so far as such limitations are specified in the claims.

While in the form of the invention shown, the same is illustrated as applied to a gang plow, it is applicable as well to single plows, and to other forms of plows than that illustrated, or to any agricultural or tillage implement where an unequal adjustment between the supporting wheels is desired.

In the accompanying drawings:

Figure 1 is a side elevation of a gang plow having my invention embodied therein, the connecting devices between the land and furrow wheels being set for normal plowing, and the plows being shown raised out of action.

Fig. 2 is a similar view showing the plows lowered into action.

Fig. 3 is a side elevation of the machine showing the connecting devices between the land and furrow wheels set for "opening up" the furrows, said plows being lowered in action.

Fig. 4 is a similar view showing the plows raised.

Referring to the drawings:

In the type of plow shown, a series of plows 1 is supported by a frame 2 consisting of a number of beam members 3 suitably connected together to form a single frame-structure, said frame being supported at its rear by a rear furrow wheel 4, and being supported at its front, at one side, by a land wheel 5, and at the opposite side by a front furrow wheel 6. The land wheel is mounted on a land wheel support 7, which is provided with an inwardly extending journal 8 mounted in suitable bearings 9 on the frame so as to rock on a horizontal transverse axis, the rocking motions of the wheel support causing the land wheel to move up and down relatively to the frame. The furrow wheel is mounted on a furrow wheel support 10 provided with an inwardly extending journal 11 mounted in suitable bearings 12 on the frame, to rock on a horizontal transverse axis, in which rocking motions of the support the furrow wheel will be moved up and down relatively to the frame, the upward movements of the wheels permitting the frame to descend and the plows to be lowered into the ground, and the downward movement of the wheels causing the frame to be elevated and raising the plows out of action.

The foregoing parts may be of the usual and ordinary construction well known in plows of this type, and except in so far as hereinafter indicated they form no part of the present invention. In applying my invention to a machine of this type, I fix to the end of the journal 8 of the land wheel support a lateral arm 13, which when the land wheel is down and with the frame and plows elevated, will extend at a slight inclination forwardly. Fixed to the journal 11 of the furrow wheel support, is a longer lateral arm 14, provided at intervals therein with a number of latch engaging openings 15. Jointed to the end of arm 13 is an adjusting lever 16 which extends forwardly, and is suitably guided in its movements on the arm 14, the said lever being provided with a locking latch 17 adapted to be releasably engaged in any one of the openings in the arm. The arm 14 is curved in an arc whose axis is coincident with the axis of the lever 16 when the two wheels are down at the same level and with the plows raised, and the latch engaging openings 15 in said arm are arranged in a row extending in an arc whose axis is likewise coincident with the axis of the lever 16. This lever forms in effect an operative connection between the two wheel supports which will cause them to move together when one of the supports is operated to raise or lower the plows, the capability of connecting the lever to the arm 14 at different points therein different distances from the axis of the arm, causing the two wheel supports to either move together the same relative vertical distances, or different relative vertical distances, according to the particular adjustment of the lever. For instance with the latch of the adjusting lever engaging in the lowermost opening in the curved arm, as shown in Figs. 3 and 4, the effective lengths of the arms by which the rocking motion of one wheel support is transmitted to the other, being the same, the two wheel supports will move in unison, the same relative distances, in the up and down movements of the supports. If, however, the lever is shifted from this position, and its latch is engaged in one of the openings farther from the axis of the arm, as shown in Figs. 1 and 2, the effective length of the arm is correspondingly increased, and therefore for a given movement of the land wheel support the furrow wheel will, while moving with the former, move a less distance. By the first adjustment of the lever in which the effective lengths of the two arms are the same, when the wheels are raised to lower the frame, they will, when the plows have been lowered to the proper depth, occupy the same relative levels as shown in Fig. 3. This will adapt the wheels to travel at the same level on the land, while the plow bottoms will be supported in level conditions in the ground, which is the position and relation of the parts when the plow is used to "open up" the first furrows. After the furrows have been opened, it is necessary of course that the furrow wheel occupy a lower level than the land wheel, to adapt the furrow wheel to travel in the furrow and the land wheel on the land, as in normal plowing, and to effect this relative position of the wheels, the adjusting lever is raised and its latch caused to engage in one of the upper openings in the arm. With the lever in its new position of adjustment, when the wheels are raised to lower the plows into action, the land wheel will be raised a greater distance than the furrow wheel, so that when the plows reach their proper depth for action as shown in Fig. 2, the land wheel will be at a higher level than the furrow wheel, the latter traveling in the furrow, and the former on the land. When, however, the wheels are again moved down to elevate the plows out of action for transportation or for turning at the end of the furrows, the wheels will move as before different relative distances, but in the opposite direction, and when they have reached their full downward limit to properly sustain the plows and frame elevated, they will occupy the same relative levels and the frame and plow bottoms will be in a level condition as shown in Fig. 1.

The effect of the connection of the adjusting lever to the curved arm at different distances from the axis of the arm, is to vary the relation of the land and furrow wheels to each other in their direction of movement, to vary the depth of cut of the plows, the depth of cut being increased as the effective length of the arm 14 is increased and vice versa. By reason of the peculiar relation of the curved arm 14 to the axis of the lever 16 in a given position of the supporting wheels, the relations between the wheels may be adjusted by merely shifting the lever on its axis and along the curved arm and connecting it in its new position, and this without the necessity of moving either of the wheels relatively to each other in making the adjustment. In other words, the connections between the two arms 13 and 14 are adjustable independently of the movement of the wheels. Owing to the fact that when the plows are down, the adjusting lever may be locked to the curved arm at different distances from the axis of said arm, as determined by the several latch engaging holes therein, the two wheels will, notwithstanding the fact that they will occupy different relative levels when elevated and with the plows down in action, move to the same relative levels when again swung down to raise the plows out of action, so that under all conditions of plowing at various depths, the frame and plows will when raised for transportation, be level, thereby avoiding the liability of gathering trash or encountering obstructions, or of the plow bottoms dragging around unevenly.

Any suitable means may be employed for raising the wheels, it being customary in machines of this type to apply such means to the land wheel, commonly in the form of a lifting lever 18 having its inner end mounted loosely on the journal of the land wheel support, and connected with said support by means of a link or strap 19, so that in the movement of the lever rearwardly, the land wheel support will be raised, and in the movement of the lever in the opposite direction, the land wheel will be lowered, the said lever being provided with a locking latch 20 adapted to engage a toothed segment frame 21 on the frame to lock the plows down at the proper depth for action. In the operation of this lever, the journal of the land wheel support will be rocked in its bearings, and the motion of the same will be transmitted to the furrow wheel support through the medium of the connecting mechanism above described and in the manner stated.

Having thus described my invention, what I claim is:

1. In a plow, the combination of a frame, ground wheel supports mounted on the frame and movable up and down relatively thereto to lower and raise the frame and having ground wheels mounted thereon, connections between said wheel supports adapted, when one of the supports is moved, to move the other a different relative distance, said connections including an adjusting lever sustained by one of the wheel supports and provided with a locking latch adapted, when the wheel supports are in a given position, to be releasably locked to the other wheel support in different relative positions thereto without changing the position of said supports.

2. In a plow, the combination of a frame, wheel supports provided with journals mounted in the frame to rock on horizontal transverse axes, ground wheels carried by said supports and movable up and down in the rocking motions of the same, lateral arms on said journals, and a connecting device jointed to one of said arms and provided with a locking latch, the other of said arms being provided with a series of latch engaging openings extending in an arc whose axis is coincident with the axis of the connecting device when the wheels are down at the same level.

3. In a plow, the combination of a frame, wheel supports provided with journals mounted on the frame to rock on horizontal transverse axes, ground wheels carried by said wheel supports and movable up and down in the rocking motions of the supports, a lateral arm on one of said journals, a lateral arm on the other journal, a lever pivoted to the first mentioned arm and means for locking said lever to the other arm at different distances, at will, from the axis of the arm.

4. In a plow, the combination of a frame, wheel supports provided with journals mounted in the frame to rock on horizontal transverse axes, ground wheels carried by said supports and movable up and down in the rocking motions of the same, a lateral arm on one of said journals, a connecting device pivoted to said arm, and a lateral arm on the other journal curved in an arc whose axis is coincident with the axis of the connecting device, when the wheels are down at the same level and the plows raised, and means for connecting said device at different points in the length of the arm.

5. In a plow, the combination of a frame, wheel supports provided with journals mounted on the frame to rock on horizontal transverse axes, ground wheels mounted on said supports, lateral arms on the journals, one of said arms being provided with a series of latch engaging openings extending in an arc whose axis is coincident with the outer end of the other lateral arm, when the ground wheels are down and the frame elevated, and an adjusting lever jointed to the last mentioned arm and provided with a locking latch to engage the openings in the other arm.

6. In a plow, the combination of a frame, wheel supports provided with journals mounted on the frame to rock on horizontal transverse axes, ground wheels mounted on said supports, a lateral arm on one of the journals, an arm on the other journal curved in an arc whose center is coincident with the outer end of the first mentioned arm when the ground wheels are down and the frame elevated, and an adjusting lever jointed to the last mentioned arm and provided with means for locking the same to the curved arm at different distances from the axis of the same.

In testimony whereof, I have affixed my signature.

WILLIAM D. DEWEND.

Copies of this patent may be obtained for five cents each, by addressing the "Commissioner of Patents, Washington, D. C."